United States Patent
Subramanian et al.

(10) Patent No.: US 10,659,135 B2
(45) Date of Patent: May 19, 2020

(54) COORDINATED DISCOVERY OF MMW CONNECTION POINTS AND UES

(71) Applicant: QUALCOMM Incorporated, San Diego, CA (US)

(72) Inventors: Sundar Subramanian, Bridgewater, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 14/306,114

(22) Filed: Jun. 16, 2014

(65) Prior Publication Data

US 2015/0365155 A1    Dec. 17, 2015

(51) Int. Cl.
*H04B 7/06* (2006.01)
*H04W 24/08* (2009.01)
(Continued)

(52) U.S. Cl.
CPC ......... *H04B 7/0697* (2013.01); *H04B 7/0617* (2013.01); *H04B 7/0628* (2013.01);
(Continued)

(58) Field of Classification Search
CPC .. H04B 7/0697; H04B 7/0628; H04B 7/0695; H04B 7/0617; H04B 7/088;
(Continued)

(56) References Cited

U.S. PATENT DOCUMENTS 6,513,758 B1 *  2/2003  Lloyd ............... B64G 1/66
                                                       244/129.1
8,374,154 B2    2/2013  Gong et al.
(Continued)

FOREIGN PATENT DOCUMENTS

CN  102783201 A  11/2012
CN  103686756 A   3/2014
(Continued)

OTHER PUBLICATIONS

International Search Report and Written Opinion—PCT/US2015/034551—ISA/EPO—dated Nov. 11, 2015.

*Primary Examiner* — Gregory B Sefcheck
*Assistant Examiner* — Joshua Smith
(74) *Attorney, Agent, or Firm* — Arent Fox LLP

(57) ABSTRACT

A method, an apparatus, and a computer program product for wireless communication are provided. The apparatus receives reference timing information, determines one or more timeslots for transmitting a beacon based on the reference timing information, and transmits the beacon during a timeslot of the one or more timeslots. The beacon is transmitted in one or more directions respectively corresponding to a number of subslots of the timeslot. In another aspect, the apparatus determines a timeslot for receiving at least one beacon respectively from at least one connection point based on the reference timing information, wakes during the timeslot, monitors for the at least one beacon in one or more directions respectively corresponding to a number of subslots of the timeslot, and receives the at least one beacon in the at least one timeslot in at least one direction of the one or more directions.

22 Claims, 17 Drawing Sheets

(51) Int. Cl.
*H04W 72/04* (2009.01)
*H04W 8/00* (2009.01)
*H04W 16/28* (2009.01)
*H04B 7/08* (2006.01)
*H04W 48/12* (2009.01)

(52) U.S. Cl.
CPC .......... *H04B 7/0695* (2013.01); *H04W 8/005* (2013.01); *H04W 24/08* (2013.01); *H04W 72/0446* (2013.01); *H04B 7/088* (2013.01); *H04W 16/28* (2013.01); *H04W 48/12* (2013.01)

(58) Field of Classification Search
CPC ................ H04B 7/0626; H04W 8/005; H04W 72/0446; H04W 24/08; H04W 48/12; H04W 16/28
See application file for complete search history.

(56) References Cited

U.S. PATENT DOCUMENTS

| | | |
|---|---|---|
| 8,625,565 B2 | 1/2014 | Cordeiro et al. |
| 2003/0231607 A1* | 12/2003 | Scanlon ................ H04W 74/04 370/338 |
| 2005/0085214 A1* | 4/2005 | Laroia ................... H04L 5/0039 455/403 |
| 2005/0152387 A1* | 7/2005 | Utsunomiya .......... H04B 7/061 370/431 |
| 2006/0040701 A1* | 2/2006 | Long .................... H04W 48/12 455/525 |
| 2006/0057964 A1* | 3/2006 | Roy ..................... H04B 7/0408 455/67.11 |
| 2006/0087423 A1* | 4/2006 | Coronel ................ H04W 74/06 455/69 |
| 2007/0298742 A1* | 12/2007 | Ketchum ............. H04B 7/0617 455/186.1 |
| 2008/0062986 A1* | 3/2008 | Shand .................... H04L 45/02 370/401 |
| 2008/0144737 A1* | 6/2008 | Naguib ................. H04L 1/0026 375/299 |
| 2009/0110031 A1* | 4/2009 | Lakkis ................. H04J 13/0014 375/130 |
| 2009/0125792 A1* | 5/2009 | Lakkis ................ H04B 7/0617 714/783 |
| 2010/0103045 A1* | 4/2010 | Liu ..................... H04L 43/0847 342/372 |
| 2010/0118835 A1* | 5/2010 | Lakkis ................ H04B 7/0408 370/336 |
| 2010/0157955 A1 | 6/2010 | Liu et al. |
| 2010/0220679 A1* | 9/2010 | Abraham ............... H04W 74/06 370/329 |
| 2010/0246546 A1* | 9/2010 | Sung .................... H04B 7/0691 370/338 |
| 2010/0265925 A1* | 10/2010 | Liu ....................... H04W 16/28 370/336 |
| 2011/0064033 A1* | 3/2011 | Gong ................... H04B 7/0617 370/329 |
| 2011/0110340 A1* | 5/2011 | Lakkis ................. H04W 74/08 370/336 |
| 2011/0205969 A1* | 8/2011 | Ahmad ................. H04W 16/28 370/328 |
| 2012/0027111 A1* | 2/2012 | Vook ..................... H04B 7/0452 375/267 |
| 2012/0028588 A1 | 2/2012 | Morioka et al. |
| 2013/0028246 A1 | 1/2013 | Gonikberg |
| 2013/0044695 A1 | 2/2013 | Xu et al. |
| 2013/0090141 A1* | 4/2013 | Hottinen ........... H04W 72/1231 455/501 |
| 2013/0279381 A1* | 10/2013 | Sampath ............... H04W 48/08 370/311 |
| 2013/0301551 A1* | 11/2013 | Ghosh .................. H04W 72/042 370/329 |
| 2014/0004865 A1* | 1/2014 | Bhargava .......... H04W 74/0816 455/445 |
| 2014/0004898 A1* | 1/2014 | Yu ...................... H04W 72/0413 455/510 |
| 2014/0185468 A1* | 7/2014 | Park ...................... H04W 48/16 370/252 |
| 2015/0103756 A1* | 4/2015 | Sinha ................... H04B 7/0491 370/329 |
| 2015/0245234 A1* | 8/2015 | Roy ..................... H04W 16/14 370/252 |
| 2015/0288427 A1* | 10/2015 | Wang ................ H04W 72/1273 370/329 |
| 2015/0289147 A1* | 10/2015 | Lou ....................... H04W 16/28 370/329 |

FOREIGN PATENT DOCUMENTS

| | | |
|---|---|---|
| CN | 103716873 A | 4/2014 |
| JP | 2010226440 A | 10/2010 |
| JP | 2013520937 A | 6/2013 |
| WO | 2011106517 A1 | 9/2011 |
| WO | 2013086164 A1 | 6/2013 |
| WO | 2014031703 A1 | 2/2014 |
| WO | 2014036059 A1 | 3/2014 |
| WO | 2014124048 A1 | 8/2014 |

* cited by examiner

COORDINATED DISCOVERY OF MMW CONNECTION POINTS AND UES

BACKGROUND

Field

The present disclosure relates generally to communication systems, and more particularly, to cooperative discovery between a connection point (CP) and a user equipment (UE) in millimeter wave (mmW) access systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a connection point (CP) for wireless communication and configured to receive reference timing information, determine one or more timeslots for transmitting a beacon based on the reference timing information, and transmit the beacon during at least one timeslot of the one or more timeslots, wherein the beacon is transmitted in one or more directions respectively corresponding to a number of subslots of the at least one timeslot, and wherein the beacon comprises beamforming capability information of the CP.

In another aspect, the apparatus may be user equipment (UE) for wireless communication and configured to receive reference timing information, determine one or more timeslots for receiving at least one beacon respectively from at least one connection point based on the reference timing information, wherein a respective beacon comprises beamforming capability information of a respective connection point, wake during at least one timeslot of the one or more timeslots, monitor for the at least one beacon in one or more directions respectively corresponding to a number of subslots of the at least one timeslot, and receive the at least one beacon in the at least one timeslot, wherein the at least one beacon is received in at least one direction of the one or more directions.

DETAILED DESCRIPTION

Figure 1:
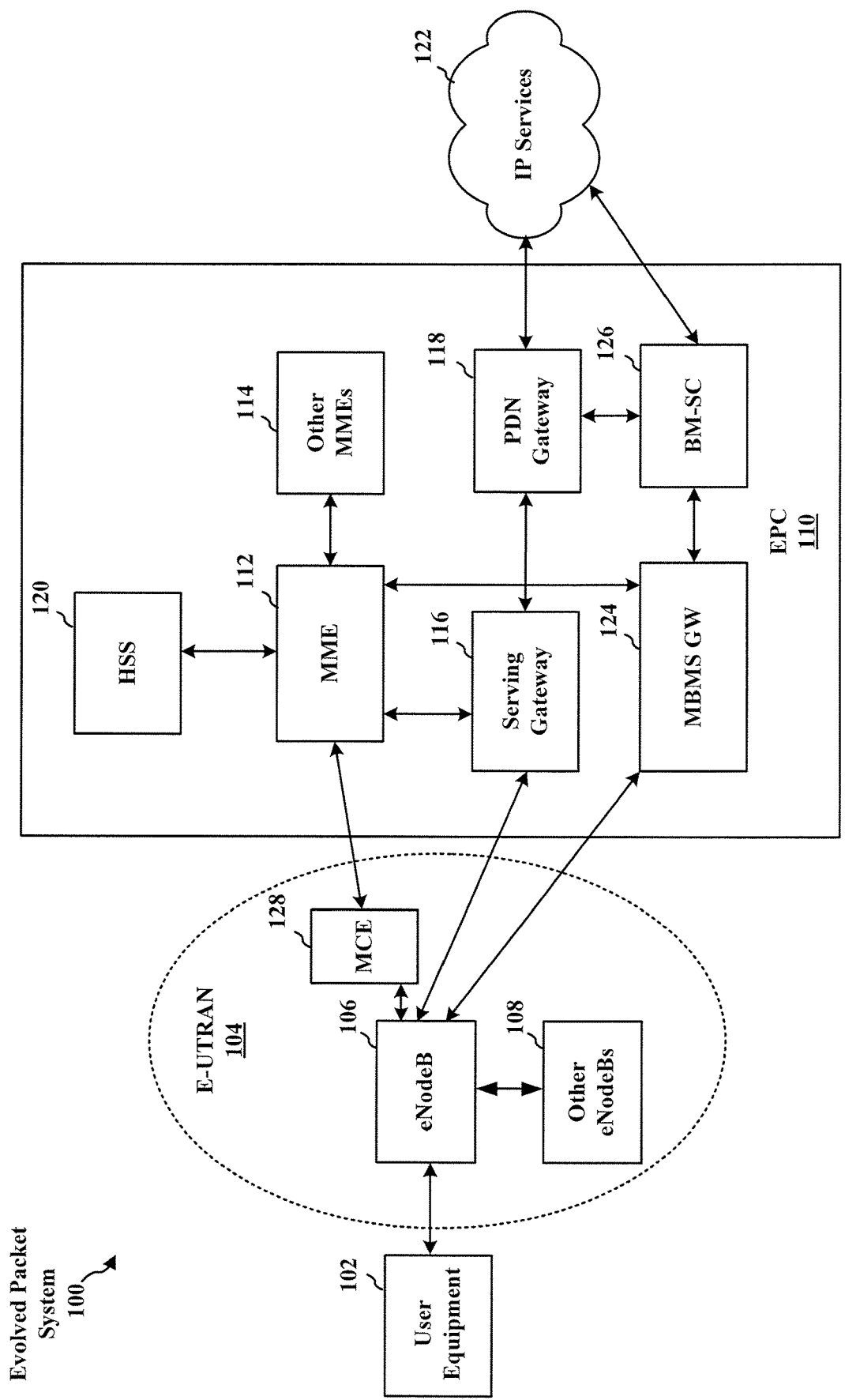
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
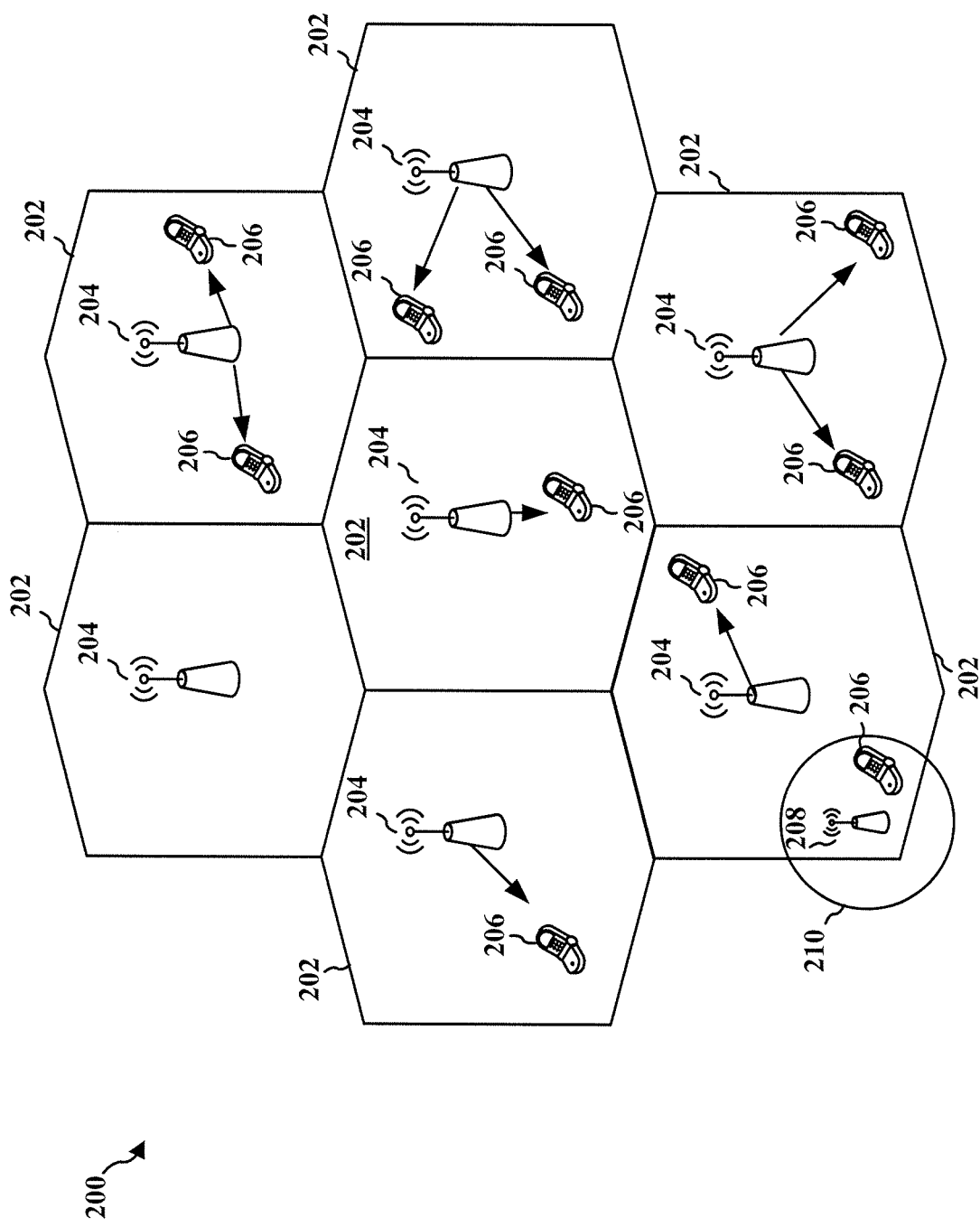
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
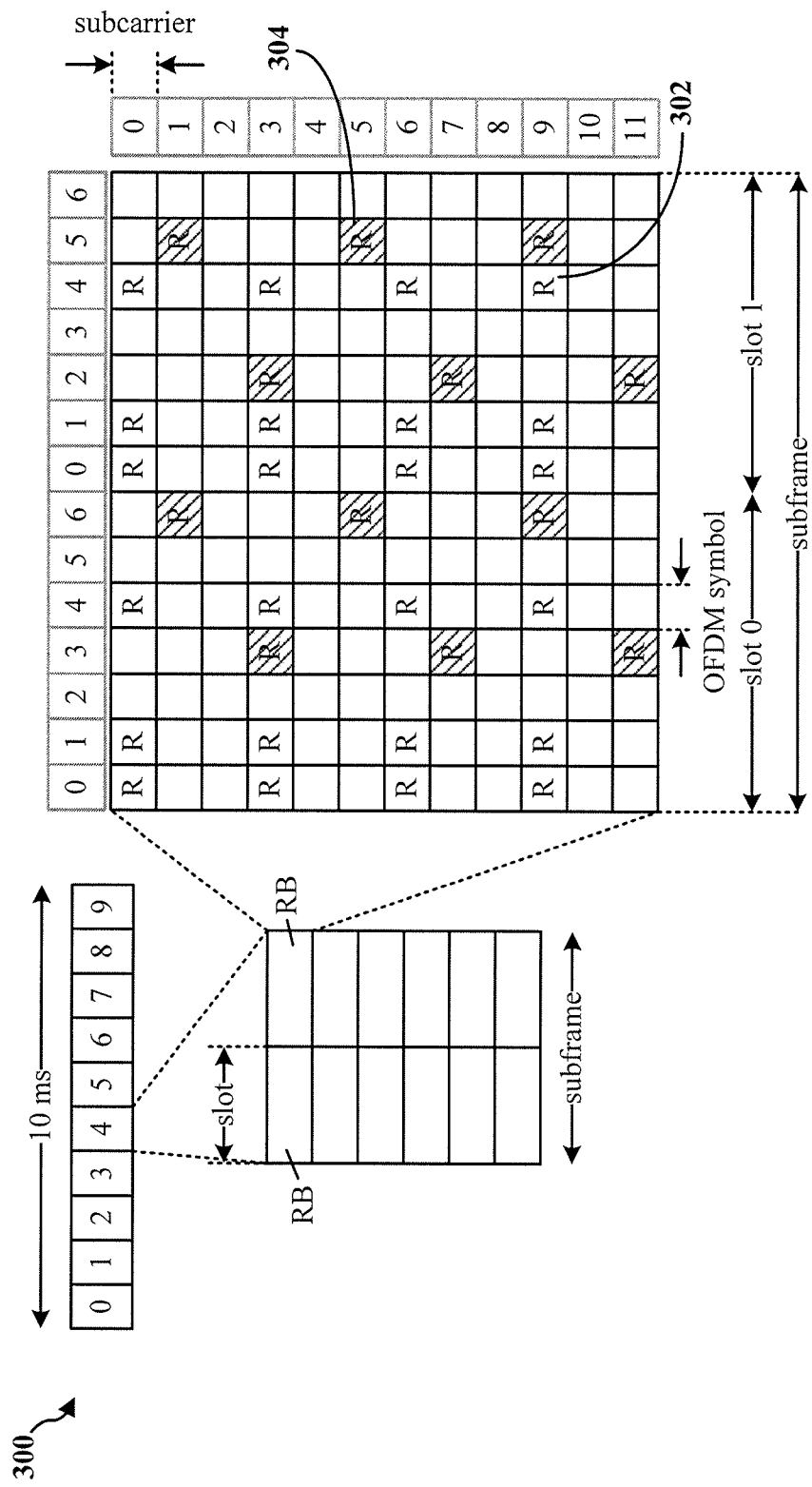
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
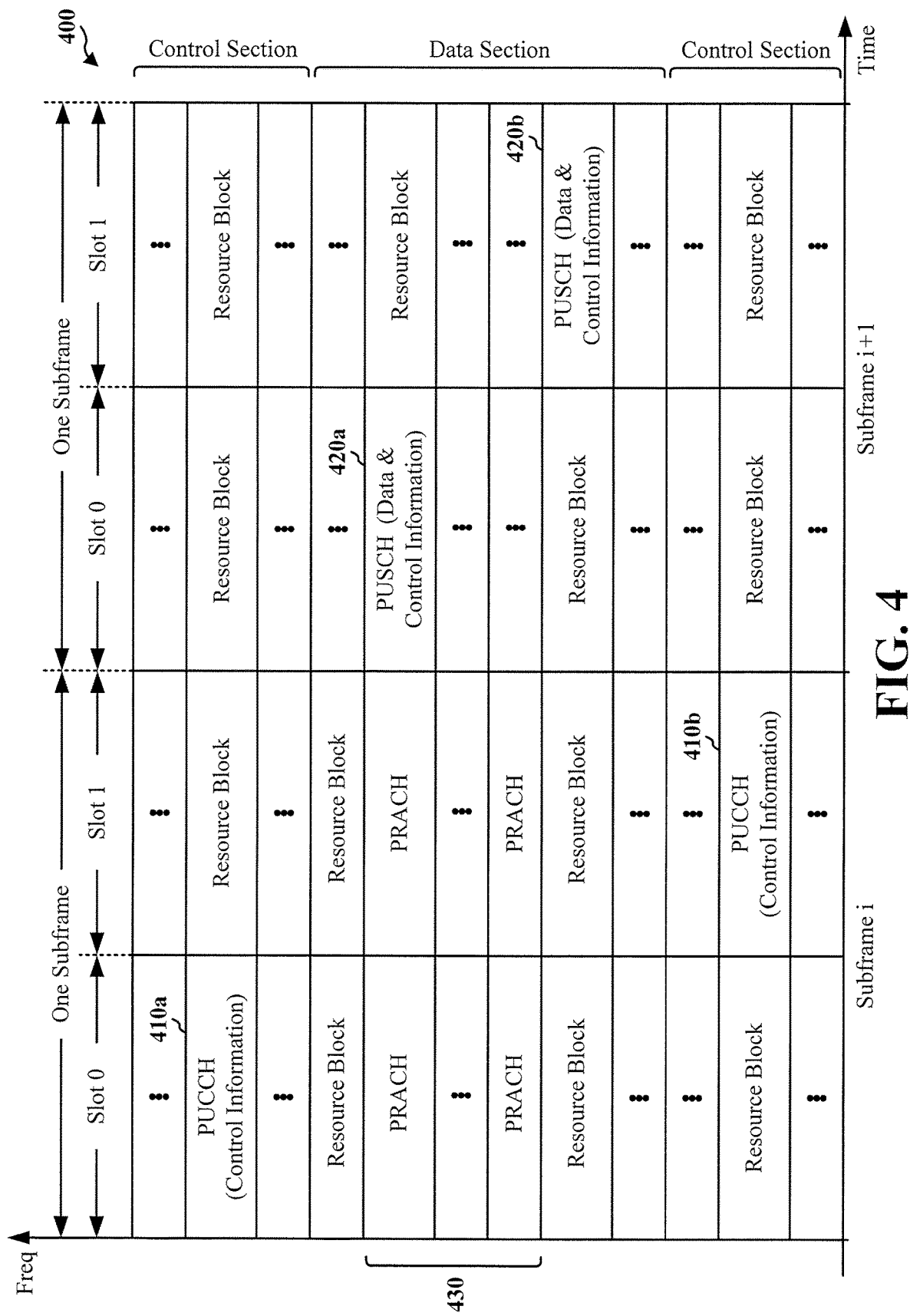
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
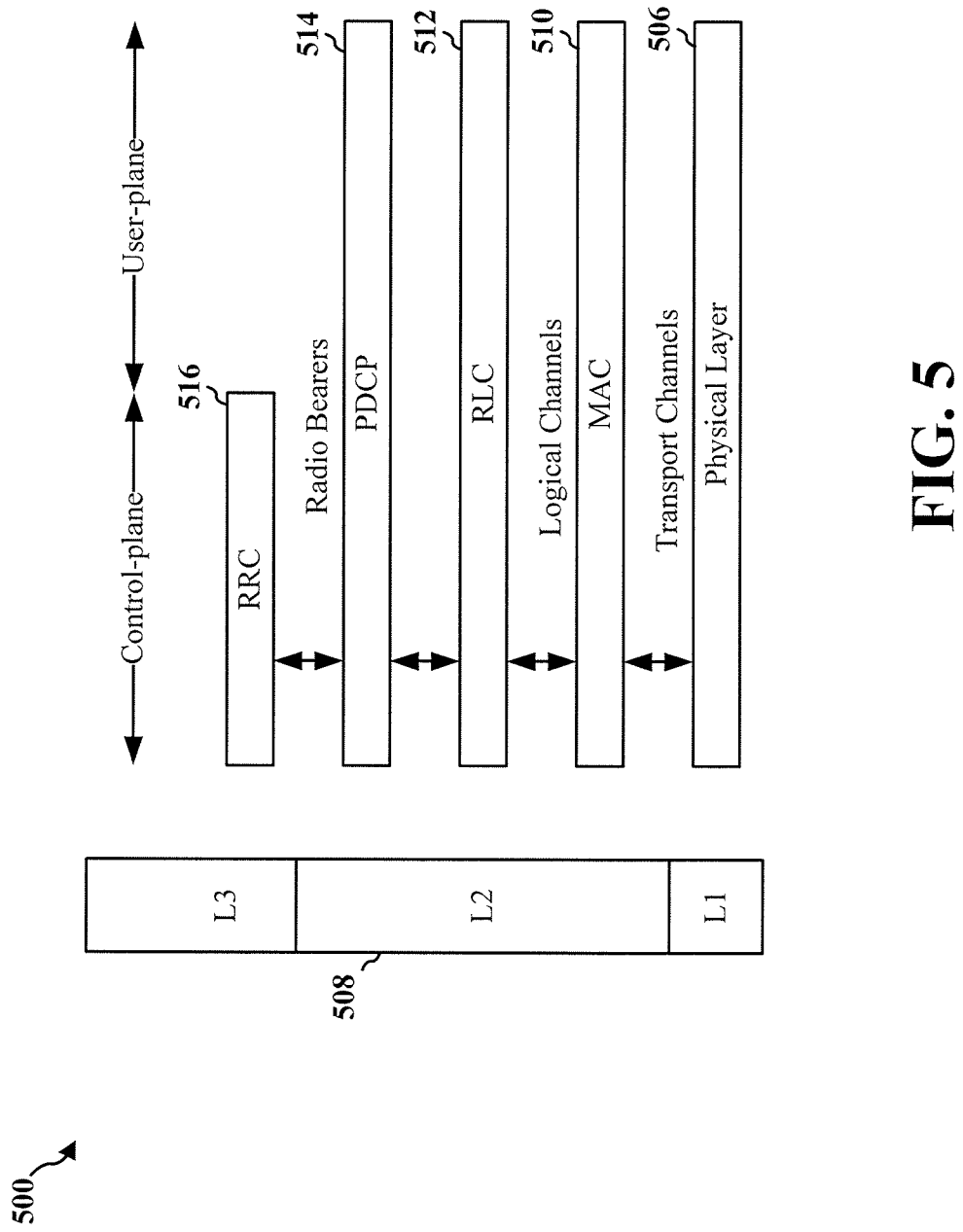
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
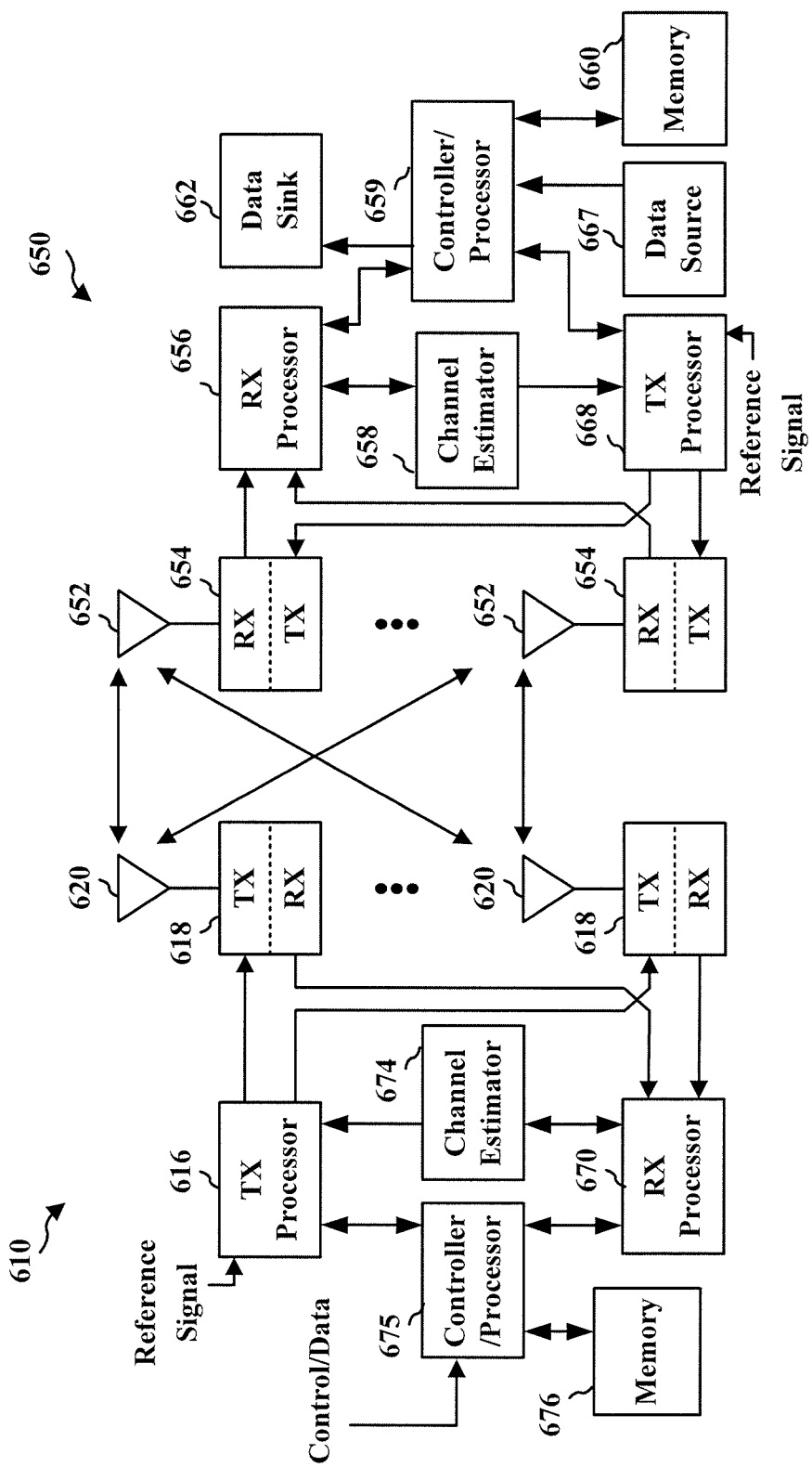
FIG. 6 is a diagram illustrating an example of an evolved Node B and user equipment in an access network.

FIG. 6 is a block diagram of a base station 610 in communication with a UE 650 in an access network. The base station 610 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 650 may be capable of communicating signals via the LTE system and/or the mmW system. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
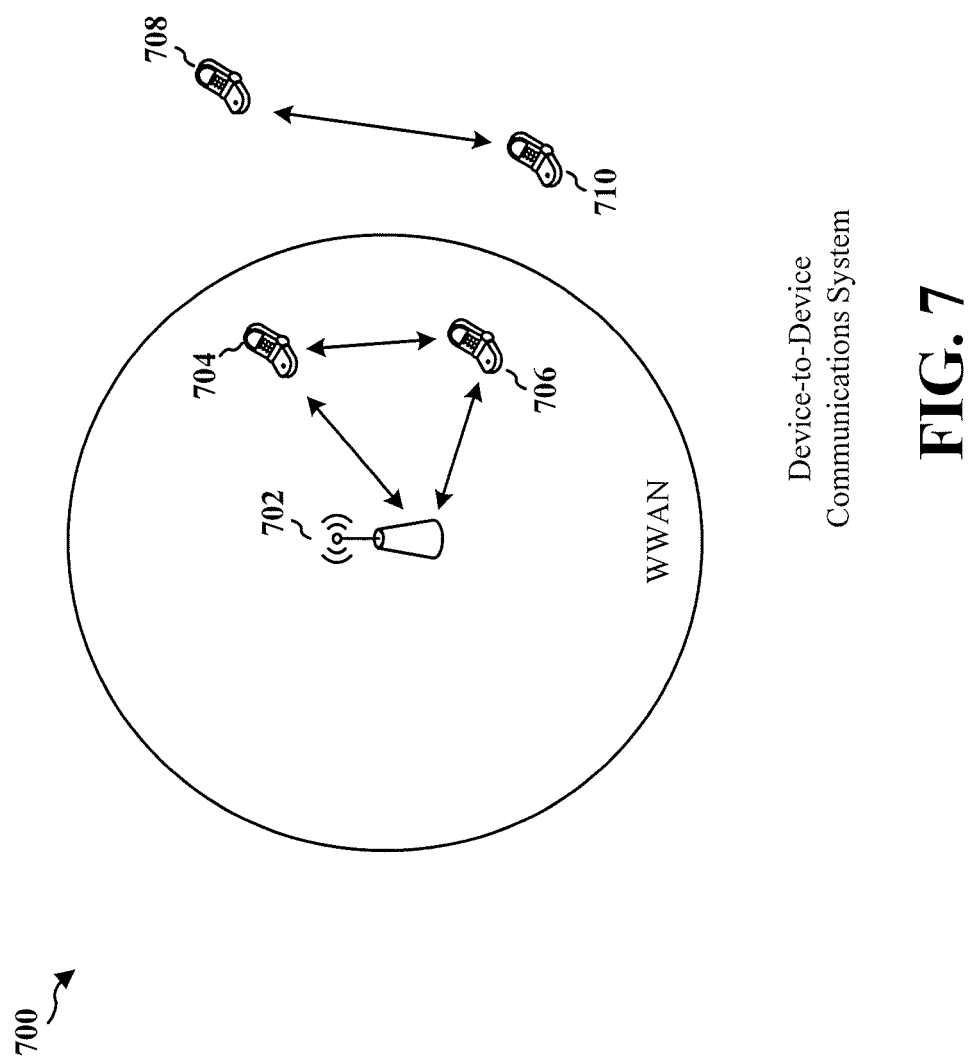
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming. A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. In an aspect, applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequencies bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of directional antennas (e.g., phased arrays) used to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, mmW-capable connection points (CPs) (network access points for mmW-capable devices) may be mounted on light poles, building sides, and/or collocated with metro cells. A mmW link may be formed by beamforming along a line of sight (LOS) or dominant reflected paths around obstacles. A challenge of a mmW-capable device is to find an appropriate LOS or reflected path for beamforming.

Figure 8A:
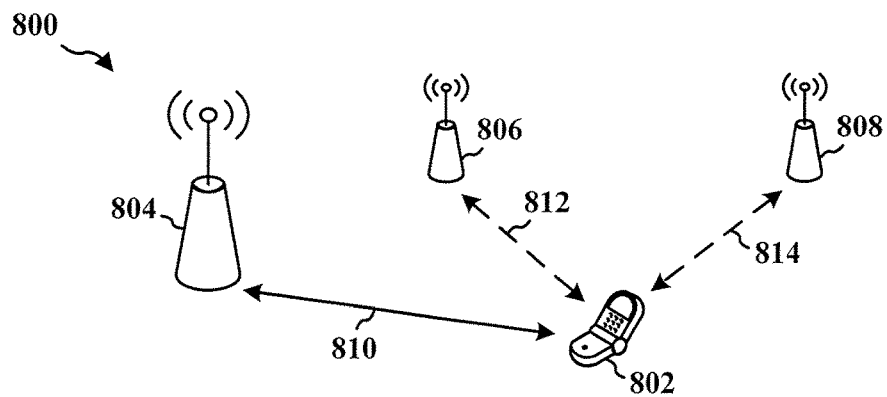
FIGS. 8A to 8C are diagrams illustrating example deployments of a mmW system used in conjunction with a LTE system.
Figure 8B:
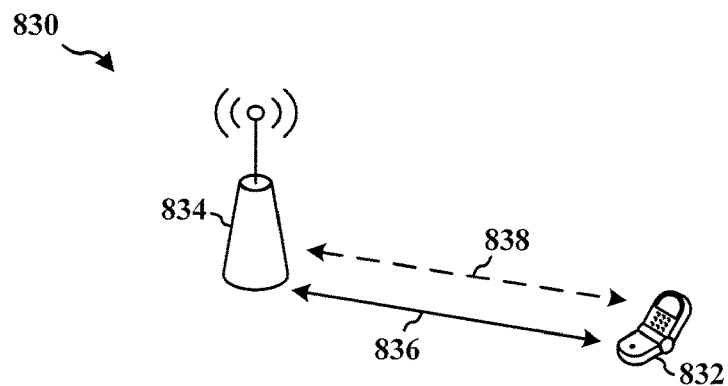
Figure 8C:
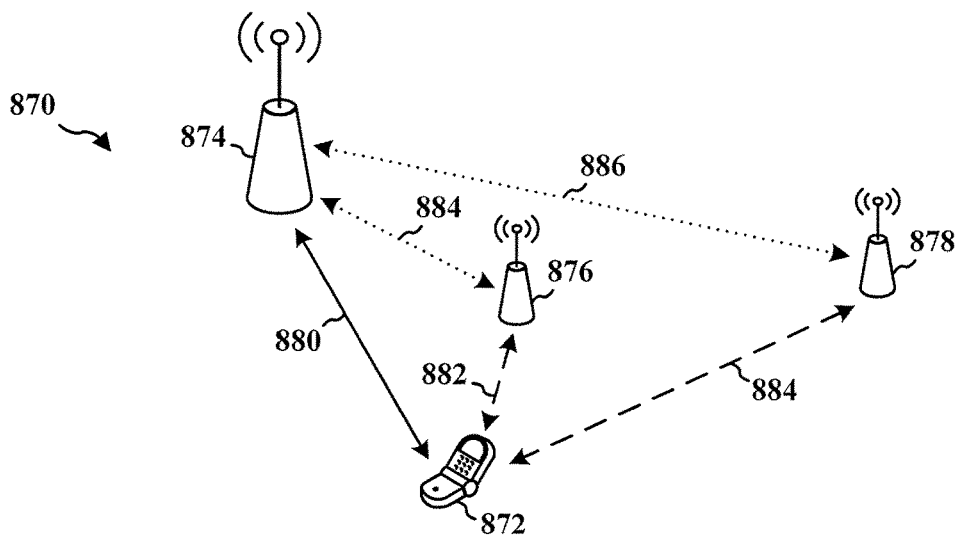

FIGS. 8A to 8C are diagrams illustrating example deployments of a mmW system used in conjunction with a LTE system. In FIG. 8A, diagram 800 illustrates a deployment where a LTE system operates independently of, and in parallel with, a mmW system. As shown in FIG. 8A, a UE 802 is capable of communicating signals via a LTE system and a mmW system. Accordingly, the UE 802 may communicate with an eNB 804 over a LTE link 810. In parallel with the LTE link 810, the UE 802 may also communicate with a first CP 806 over a first mmW link 812 and communicate with a second CP 808 over a second mmW link 814.

In FIG. 8B, diagram 830 illustrates a deployment where the LTE system and the mmW system are collocated. As shown in FIG. 8B, a UE 832 is capable of communicating signals via the LTE system and the mmW system. In an aspect, a base station 834 may be an LTE eNB capable of communicating signals via the LTE system and the mmW system. As such, the base station 834 may be referred to as a LTE+mmW eNB. In another aspect, the base station 834 may be a mmW CP capable of communicating signals via the LTE system and the mmW system. As such, the base station 834 may be referred to as a LTE+mmW CP. The UE 832 may communicate with the base station 834 over a LTE link 836. Meanwhile, the UE 832 may also communicate with the base station 834 over a mmW link 838.

In FIG. 8C, diagram 870 illustrates a deployment where a base station capable of communicating signals via the LTE system and the mmW system (LTE+mmW base station) is present with CPs capable of communicating signals via the mmW system only. As shown in FIG. 8C, a UE 872 may communicate with a LTE+mmW base station 874 over a LTE link 880. The LTE+mmW base station 874 may be a LTE+mmW eNB or a LTE+mmW CP. In parallel with the LTE link 880, the UE 872 may also communicate with a first CP 876 over a first mmW link 882 and communicate with a second CP 878 over a second mmW link 884. The first CP 876 may further communicate with the LTE+mmW base station 874 over a first mmW backhaul link 884. The second CP 878 may further communicate with the LTE+mmW base station 874 over a second mmW backhaul link 886.

Figure 9:
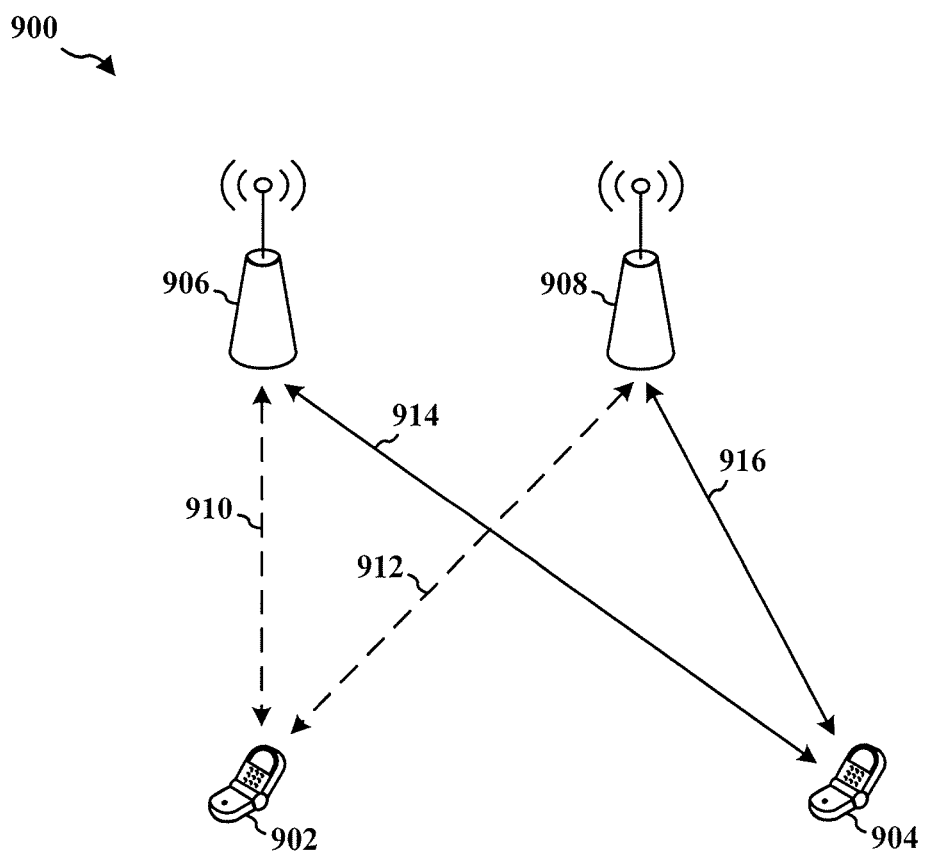
FIG. 9 is a diagram illustrating a mmW system operating scenario.

FIG. 9 is a diagram 900 illustrating a mmW system operating scenario. A network may include a number of mmW CPs (e.g. CP 906 and CP 908) deployed in a region to enable UEs (e.g., UE 902 and UE 904) to connect to the mmW CPs over high frequency beamformed channels. As shown in FIG. 9, the UE 902 may form a mmW link 910 with the CP 906 and/or a mmW link 912 with the CP 908. The UE 904 may form a mmW link 914 with the CP 906 and/or a mmW link 916 with the CP 908. In an aspect, the mmW CPs (CP 906 and CP 908) may transmit beamformed signals in different directions. A UE (UE 902 or UE 904) may determine an optimal transmit direction of a beamformed signal transmitted from a CP and attempt synchronization to the CP based on the optimal transmit direction of the CP. The UE may also determine optimal transmit and receive directions of the UE to enhance signal transmission/reception performance.

Figure 10A:
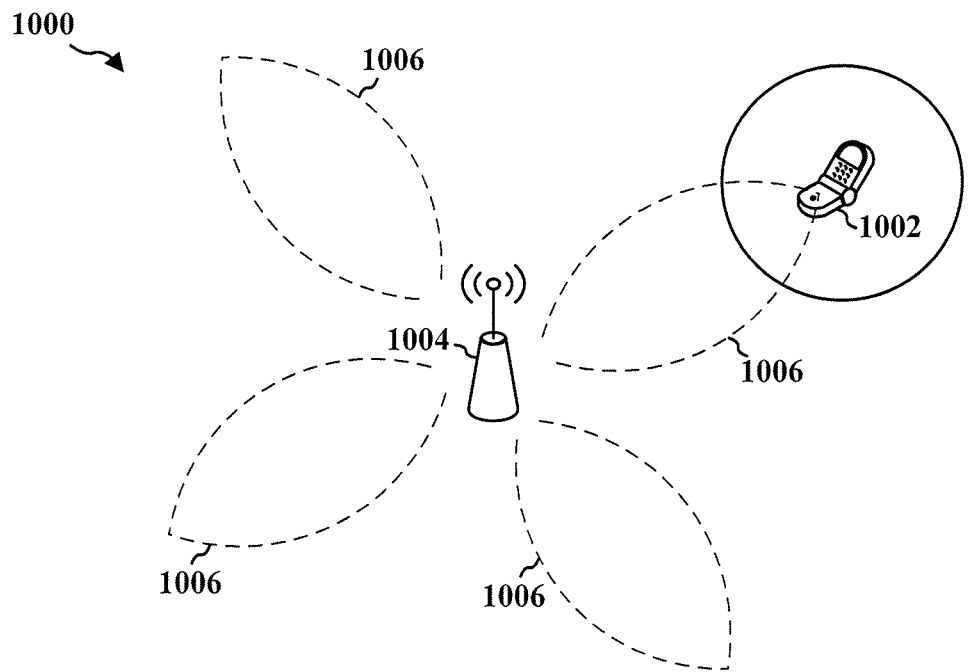
FIGS. 10A and 10B are diagrams illustrating an example of the transmission of beamformed signals between a CP and a UE.
Figure 10B:
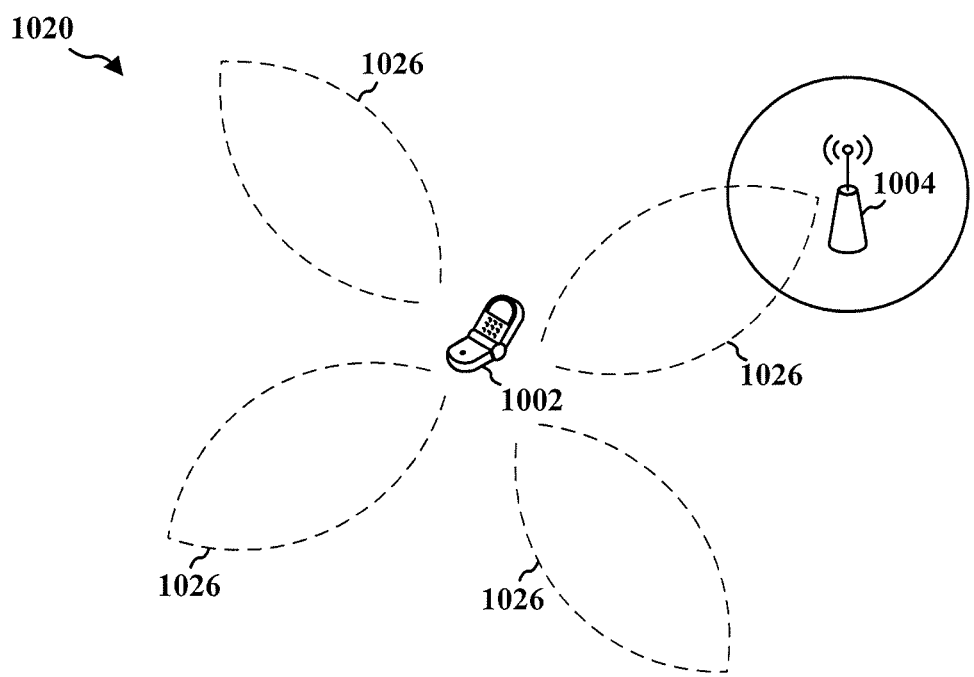

FIGS. 10A and 10B are diagrams illustrating an example of the transmission of beamformed signals between a CP and a UE. Referring to FIG. 10A, diagram 1000 illustrates a CP 1004 of a mmW system transmitting beamformed signals 1006 (e.g., synchronization signals or discovery signals) in different transmit directions. After transmitting the signals, the CP 1004 may switch to a receive mode. In the receive mode, the CP 1004 may sweep through different receive directions in a sequence or pattern corresponding (mapping) to a sequence or pattern in which the CP 1004 transmits the synchronization/discovery signals in the different transmit directions. A dwell time on each beamformed signal allows a UE 1002 to perform a receive (Rx) sweep. The UE 1002 in a receive mode may sweep through different receive directions in an attempt to detect a synchronization/discovery signal 1006. One or more of the synchronization/discovery signals 1006 may be detected by the UE 1002. When a strong synchronization/discovery signal 1006 is detected, the UE 1002 may determine an optimal transmit direction of the CP 1004 and an optimal receive direction of the UE 1002 corresponding to the strong synchronization/discovery signal. For example, the UE 1002 may determine preliminary antenna weights/directions of the strong synchronization/discovery signal 1006, and may further determine a time and/or resource where the CP 1004 is expected to optimally receive a beamformed signal. Thereafter, the UE 1002 may attempt synchronization/discovery to the CP 1004 via a beamformed signal.

Referring to FIG. 10B, the UE 1002 may attempt the synchronization/discovery by transmitting beamformed signals 1026 (e.g., synchronization/discovery signals) in different transmit directions. In an aspect, the UE 1002 may transmit a synchronization/discovery signal 1026 by transmitting along the optimal receive direction of the UE 1002 at the time/resource where the CP 1004 is expected to optimally receive the synchronization/discovery signal. The CP 1004 in the receive mode may sweep through different receive directions and detect the synchronization/discovery signal 1026 from the UE 1002 during one or more timeslots corresponding to a receive direction. When a strong synchronization/discovery signal 1026 is detected, the CP 1004 may determine an optimal transmit direction of the UE 1002 and an optimal receive direction of the CP 1004 corresponding to the strong synchronization/discovery signal. For example, the CP 1004 may determine preliminary antenna weights/directions of the strong synchronization/discovery signal 1026, and may further determine a time and/or resource where the UE 1002 is expected to optimally receive a beamformed signal. The process discussed above with respect to FIGS. 10A and 10B may be refined or repeated over time such that the UE 1002 and CP 1004 eventually learn the most optimal transmit and receive directions for establishing a link with each other.

In an aspect, the CP 1004 may choose a sequence or pattern for transmitting the synchronization/discovery signals according to a number of beamforming directions. The CP 1004 may then transmit the signals for an amount of time long enough for the UE 1002 to sweep through a number of beamforming directions in an attempt to detect a synchronization/discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. Upon detecting a synchronization/discovery signal from the CP 1004, the UE 1002 may discover that the strongest synchronization/discovery signal is received when the UE 1002 beamforming direction is k=2 and the CP 1004 beamforming direction is n=3. Accordingly, the UE 1002 may use the same antenna weights/directions for responding (transmitting a beamformed signal) to the CP 1004 in a corresponding response timeslot. That is, the UE 1002 may send a signal to the CP 1004 using UE 1002 beamforming direction k=2 during a timeslot when the CP 1004 is expected to perform a receive sweep at CP 1004 beamforming direction n=3.

In an aspect, the operation described above with respect to FIGS. 10A and 10B may be limited by a link budget, at least during the initial stages of the operation, and therefore not robust. Accordingly, a lower-frequency system, such as LTE, may be utilized to accelerate the process. For example, LTE may be used to obtain timing information (or offsets), beamforming periodicities, and/or device capabilities. LTE signaling may provide information regarding how mmW access symbols and timing relate to an LTE frame structure (e.g., offset information). Moreover, LTE channels may be used to signal acknowledgement messages, beam search response messages, etc. In an aspect, if the mmW system is particularly unreliable, a majority of data bits to be communicated from a transmitter to a receiver may be sent over a LTE channel while necessary signatures, pilots, etc. may be sent over a mmW channel to assist synchronization and discovery.

In an aspect, the discovery of devices (CPs or UEs) in a highly beamformed system may not only be performed with respect to the time domain (e.g., searching for a sequence or signature in time), but also with respect to the angular domain since broad antenna patterns may be unsuitable for overcoming the link budget. Thus, the CPs and/or UEs may transmit detection sequences in non-omni-directional patterns (e.g., transmit beams of some angle width) and sweep over different directions/angles.

Initial synchronization and discovery allows a CP and UE to obtain a sense of timing and frequency offset between each other. To enable efficient discovery of CPs and/or UEs, a common timing (e.g., reference timing) may be used.

Figure 11A:
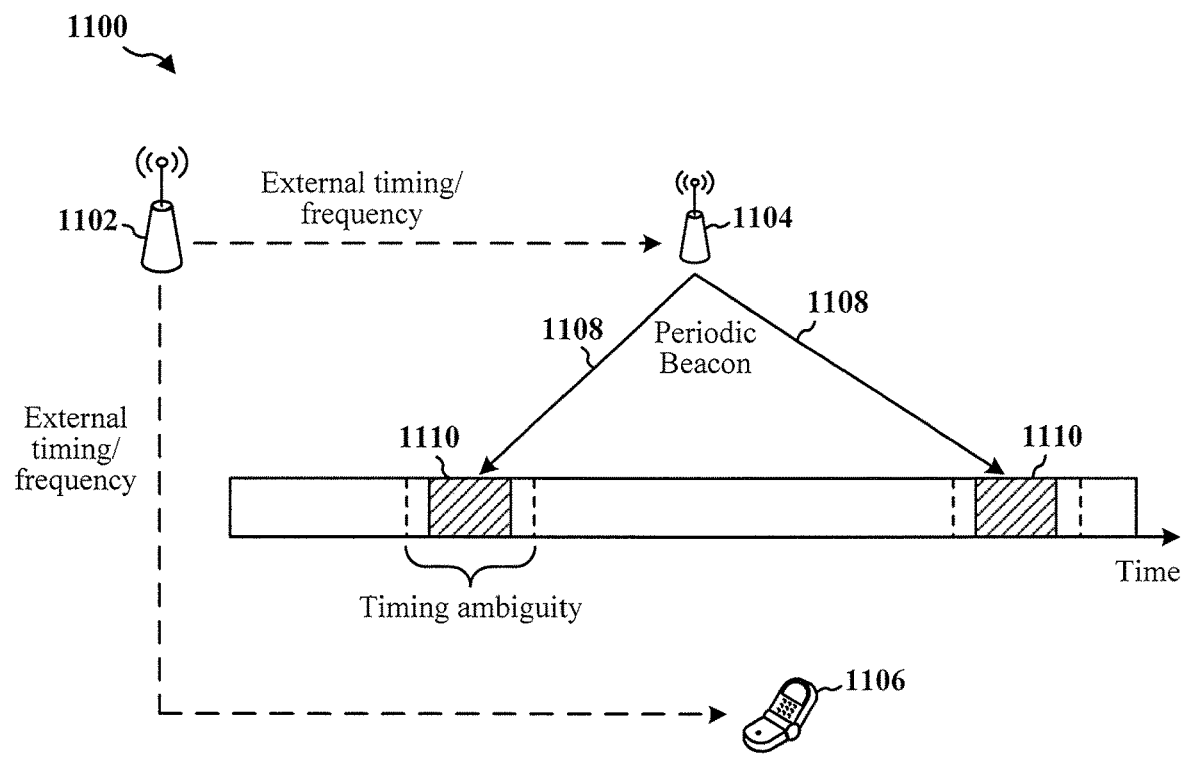
FIG. 11A is a diagram illustrating an example of using external timing/frequency information for transmitting a signal.

FIG. 11A is a diagram 1100 illustrating an example of using external timing/frequency information for transmitting a signal. Referring to FIG. 11A, a CP (e g, mmW CP) 1104 may obtain a coarse level of timing information and/or carrier frequency correction from an external source 1102, such as an LTE source, a Global Positioning System (GPS) source, or other type of source. A UE 1106 may also obtain a similar level of timing information and/or carrier frequency correction from the external source 1102. With the availability of the coarse timing, the CP 1104 may transmit periodic beacon signals (or "beacons") 1108 that are capable of being detected by the UE 1106 even in the presence of a coarse timing granularity having a timing ambiguity.

The CP 1104 may send the periodic beacons 1108 in different directions (e.g., according to a beam sweep) in coarse timeslots 1110 that are defined in relation to the external source 1102 (e.g., LTE source). The relationship between the different directions and the coarse timeslots 1110 may be broadcast by the external source 1102 or defined as a common offset from an absolute time (e.g., Universal Time Clock (UTC) time). Once an approximate common timeline between the CP 1104 and the UE 1106 is established, efficient synchronization and discovery between the CP 1104 and the UE 1106 may be achieved.

Figure 11B:
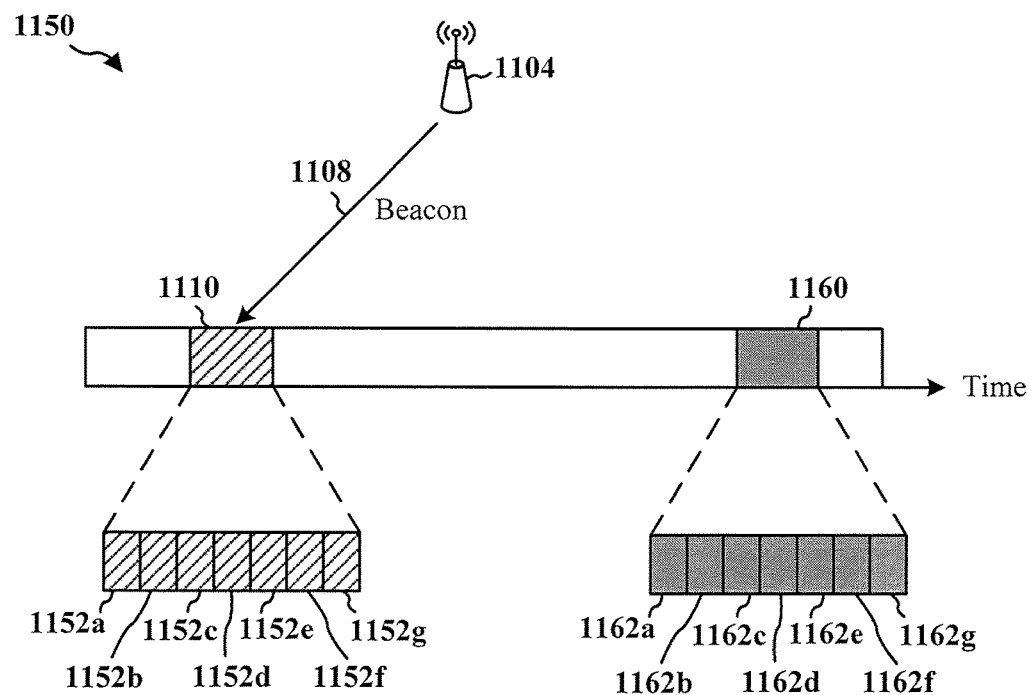
FIG. 11B is a diagram illustrating an example of communicating a beamformed signal in timeslot subslots.

FIG. 11B is a diagram 1150 illustrating an example of communicating a beamformed signal in timeslot subslots. Referring to FIG. 11B, a timeslot 1110 may include a number of transmit subslots 1152 (e.g., subslots 1152a, 1152b, 1152c, 1152d, 1152e, 1152f, and 1152g). The CP 1104 may beamform a beacon in a particular direction in each transmit subslot 1152. The timeslot 1110 may be determined from timing information received from an external source 1102 (e.g., LTE source). Any one of the transmit subslots 1152 for beamforming the beacon in the particular direction may persist across different timeslots. This helps receivers minimize a search effort when tracking/receiving beacons.

To prevent the collision of beacons transmitted from different CPs, the CP 1104 may pseudo-randomize an angular sweep (particular directions) at which the beacon is transmitted in the transmit subslots 1152. For example, the CP 1104 may assign beamforming weights for transmitting the beacon in each transmit subslot 1152 according to a periodic or pseudo-random manner. By pseudo-randomizing the particular directions at which the beacon is transmitted, a beacon transmission pattern may be predicted by a receiver (e.g., UE 1106) while minimizing beacon collisions caused by two or more CPs transmitting a beacon in the same beamforming direction at the same time.

Referring to FIG. 11B, the CP 1104 may use a different timeslot 1160 when operating as a receiver. The CP 1104 may receive beamformed signals from a transmitter (e.g., UE 1106) in the timeslot 1160. The timeslot 1160 may include a number of receive subslots 1162 (e.g., subslots 1162a, 1162b, 1162c, 1162d, 1162e, 1162f, and 1162g). The CP 1104 may receive a signal in a receive subslot 1162 according to a same beamforming direction at which the CP 1104 transmitted a beacon in a transmit subslot 1152. For example, in each receive subslot 1162, the CP 1104 may assign beamforming weights that are symmetric to, or a permuted version of, the beamforming weights assigned to a corresponding transmit subslot 1152. In an aspect, the beamforming directions of the transmit subslots 1152 for transmitting a signal may have a one-to-one mapping with the beamforming directions of the receive subslots 1162 for receiving a signal. For example, the beamforming direction of transmit subslot 1152a may be the same as the beamforming direction of receive subslot 1162a, the beamforming direction of transmit subslot 1152b may be the same as the beamforming direction of receive subslot 1162b, the beamforming direction of transmit subslot 1152c may be the same as the beamforming direction of receive subslot 1162c, and so forth.

In an aspect, the CP 1104 may be capable of digital beamforming, and can transmit multiple beamformed signals simultaneously, unlike analog beamforming devices where the beamforming weights have to be set at the RF before sampling and digitizing a signal. Accordingly, the CP 1104 may simultaneously transmit synchronization/discovery signals in multiple directions. In a further aspect, the CP 1104 may transmit synchronization signals on one beam to a device even when connected, or transmitting data on another beam, to another device.

The CP 1104 may randomize transmissions and may choose to remain silent for a number of subslots (e.g., subslots 1152), or for an entire timeslot (e.g., timeslot 1110) in order to discover the presence of nearby CPs. Such connectivity between the CPs is useful to handle mobility in a network.

The beacon transmitted by the CP 1104 may include a variety of information. For example, the beacon may include CP capability information including, for example, digital beamforming capability, transmit power, maximum transmit power, number of antennas, number of sectors, capability to see other CPs, and connectivity/mobility to external networks (e.g., LTE). The beacon may further include beacon periodicity, cell ID or other identification to enable the UE to identify the CP, mapping of transmit beamforming subslots to corresponding receive beamforming subslots, and/or locations of receive timeslots with respect to transmit times lots.

Referring to FIGS. 11A and 11B, the UE 1106 may operate as follows. The UE 1106 may wake and obtain coarse timing information and/or carrier frequency correction from the external source 1102. The UE 1102 may also determine an offset to the coarse timing information, by receiving a broadcast signal from the external source 1102, or from a common offset from an absolute time (e.g., UTC).

The UE 1102 may wake to receive during selective timeslots corresponding to discovery/synchronization timeslots. In an aspect, the UE 1102 may sweep through a number of subslots of a timeslot according to a receive beamformed pattern.

The UE 1102 may transmit a response signal to the CP 1104 in a subslot corresponding to a subslot in which a beacon was received from the CP 1104 with a power greater than a threshold (e.g., subslot in which the beacon was received with a highest power). The UE 1102 may select a CP from among a number of CPs that transmitted a respective beacon in the same subslot according to a received signal strength of the respective beacon and/or the beamforming capability information included in the respective beacon.

The UE 1102 may receive additional improved timing from the external source 1102 and/or the CP 1104 and adjust timeslot boundaries for receiving signals based on the improved timing. The UE 1102 may also adjust a transmission power based on a received power of a beacon in a chosen beamforming direction. For example, the UE 1102 may increase the transmission power if the beacon received power is weak (below a threshold), and reduce the transmission power if the beacon received power is strong (above a threshold).

Figure 12:
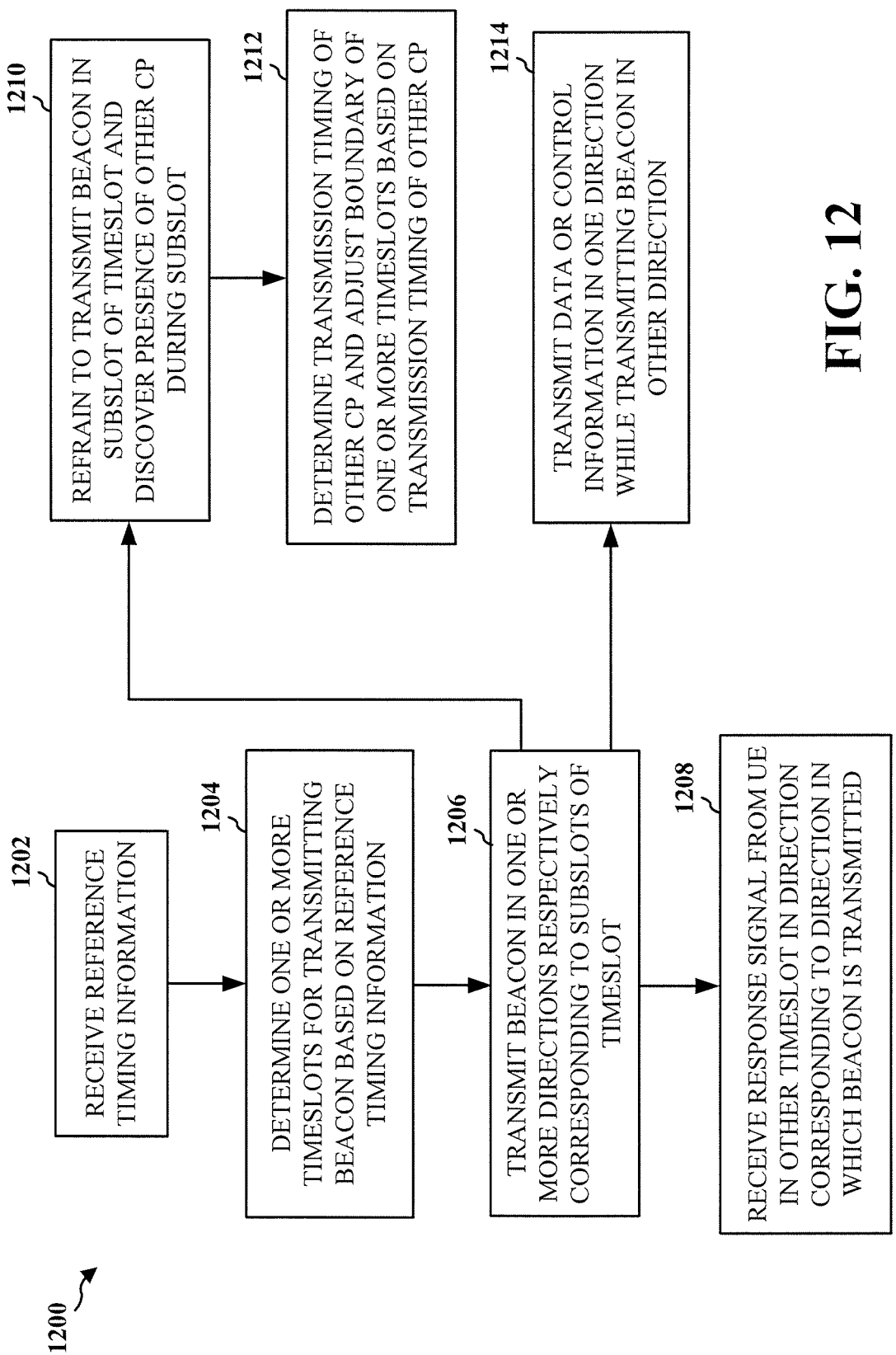
FIG. 12 is a flow chart of a method of wireless communication.

FIG. 12 is a flow chart 1200 of a method of wireless communication. The method may be performed by a connection point (CP) capable of communicating signals via lower-frequency channels (e.g., via a LTE system) and higher-frequency channels (e.g., via a mmW system). At step 1202, the CP receives receiving reference timing information. For example, the CP receives the reference timing information from an external source (e.g., external source 1102).

At step 1204, the CP determines one or more timeslots (e.g. timeslot 1110) for transmitting a beacon based on the reference timing information. At step 1206, the CP transmits the beacon during at least one timeslot of the one or more timeslots. The beacon may be transmitted in one or more directions respectively corresponding to a number of subslots (e.g., subslots 1152) of the at least one timeslot (e.g., timeslot 1110). Moreover, the beacon may include beamforming capability information of the CP. In an aspect, the beacon may be transmitted in a direction selected according to a pseudo-random method. The pseudo-random method may be computed based on a cell identifier of the CP or assigned to the CP. In a further aspect, the beacon may be transmitted in a plurality of directions simultaneously.

After step 1206 the method may proceed to step 1208, wherein the CP may receive a response signal from a user equipment (UE) (e.g., UE 1106) during at least one other timeslot (e.g., timeslot 1160) of the one or more timeslots. The response signal may be received in a direction corresponding to the one or more directions in which the beacon is transmitted.

Additionally or alternatively, after step 1206 the method may proceed to step 1210, wherein the CP refrains to transmit the beacon in at least one subslot of the at least one timeslot, and discovers a presence of at least one other CP during the at least one subslot. Thereafter, at step 1212, the CP determines a transmission timing of the at least one other CP and adjusts a boundary of the one or more timeslots based on the transmission timing of the at least one other CP. The beacon may be transmitted in a subband different from a subband used by the at least one other CP for transmission.

Additionally or alternatively, after step 1206 the CP may proceed to step 1214, wherein the CP may transmitting data or control information in at least one direction while transmitting the beacon in at least one other direction.

Figure 13:
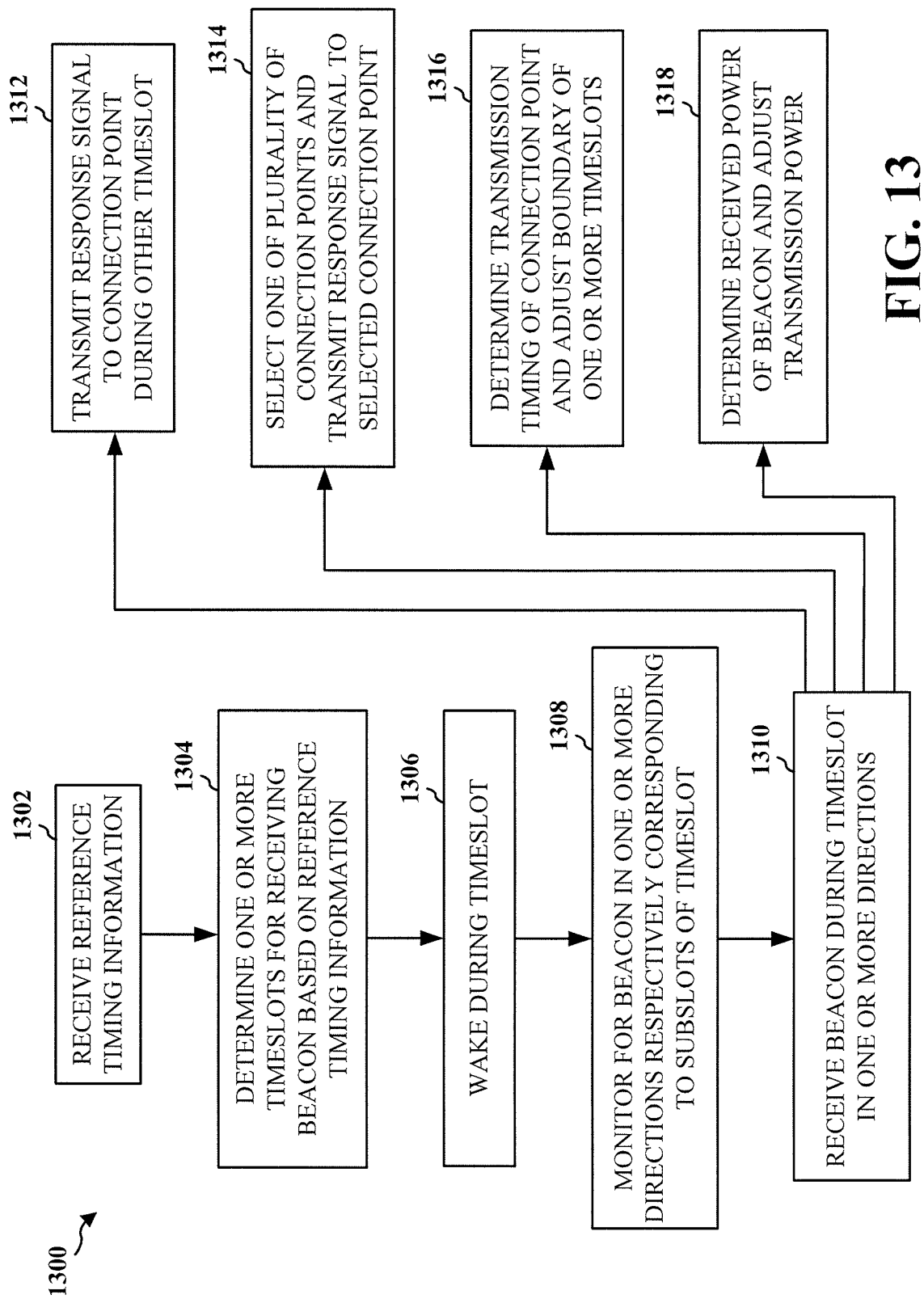
FIG. 13 is a flow chart of a method of wireless communication.

FIG. 13 is a flow chart 1300 of a method of wireless communication. The method may be performed by a UE capable of communicating signals via lower-frequency channels (e.g., via a LTE system) and higher-frequency channels (e.g., via a mmW system). At step 1302, the UE receives receiving reference timing information. For example, the UE receives the reference timing information from an external source (e.g., external source 1102).

At step 1304, the UE determines one or more timeslots (e.g. timeslot 1110) for receiving at least one beacon respectively from at least one connection point (e.g., CP 1104) based on the reference timing information. A respective beacon may include beamforming capability information of a respective connection point.

At step 1306, the UE wakes during at least one timeslot (e.g., timeslot 1110) of the one or more timeslots. At step 1308, the UE monitors for the at least one beacon in one or more directions respectively corresponding to a number of subslots (e.g., subslots 1152) of the at least one timeslot (e.g., timeslot 1110).

At step 1310, the UE receives the at least one beacon in the at least one timeslot. The at least one beacon may be received in at least one direction of the one or more directions.

After step 1310 the method may proceed to step 1312, wherein the UE transmits a response signal to a connection point (e.g., CP 1104) during at least one other timeslot (e.g., subslot 1160) of the one or more timeslots. The response signal may be transmitted in a subslot (e.g., subslot 1162c) of the at least one other timeslot (timeslot 1160) corresponding to a subslot (e.g., subslot 1152c) of the at least one timeslot (timeslot 1110) in which a beacon is received with a power greater than a threshold.

Additionally or alternatively, after step 1310 the method may proceed to step 1314, wherein the UE selects one of a plurality of connection points that transmitted a respective beacon in the same subslot (e.g., subslot 1152b) of the at least one timeslot (timeslot 111). The selection may be based on the beacon that is received with a signal strength greater than a threshold and/or the beamforming capability information included in the respective beacon. The UE then transmits a response signal to the selected connection point during at least one other timeslot (e.g., timeslot 1160) of the one or more timeslots. The response signal may be transmitted in a subslot (e.g., subslot 1162f) of the at least one other timeslot (timeslot 1160) corresponding to the subslot (e.g., subslot 1152f) of the at least one timeslot (timeslot 1110) in which the beacon from the selected connection point is received. In an aspect, the beacon from the selected connection point is received using a first receive direction. The response signal may be transmitted to the selected connection point using a first transmit direction corresponding to the first receive direction.

Additionally or alternatively, after step 1310 the method may proceed to step 1316, wherein the UE determines a transmission timing of the at least one connection point based on the beamforming capability information. Thereafter, the UE may adjust a boundary of the one or more timeslots based on the transmission timing of the at least one connection point.

Additionally or alternatively, after step 1310 the method may proceed to step 1318, wherein the UE determines a received power of the at least one beacon. Thereafter, the UE adjusts a power for transmitting a signal based on the received power of the at least one beacon.

Figure 14:
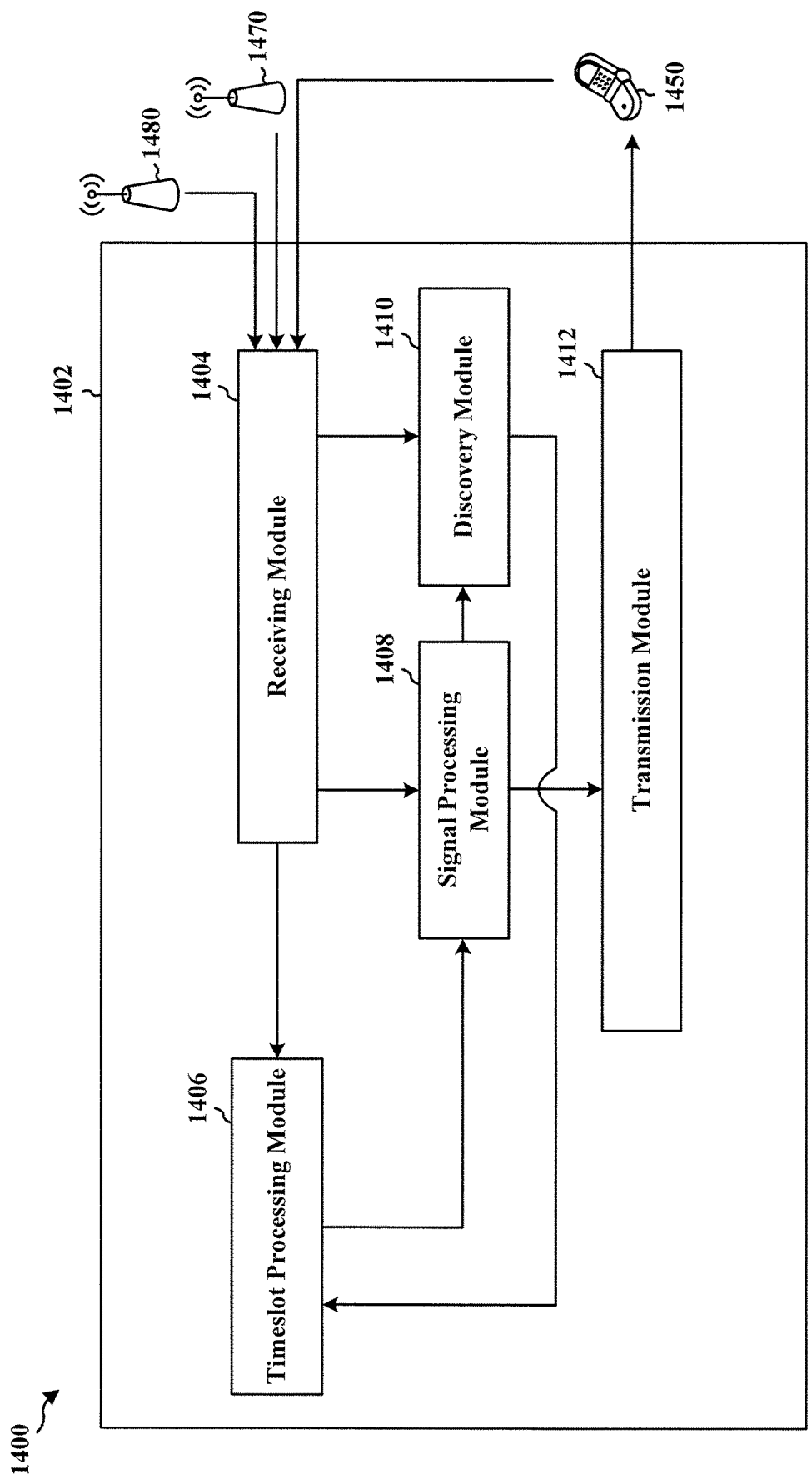
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a connection point (CP) capable of communicating signals via lower-frequency channels (e.g., via a LTE system) and higher-frequency channels (e.g., via a mmW system). The apparatus includes a receiving module 1404, a timeslot processing module 1406, a signal processing module 1408, a discovery module 1410, and a transmission module 1412.

The receiving module 1404 receives receiving reference timing information. For example, the receiving module 1404 receives the reference timing information from an external source 1470 (e.g., LTE source).

The timeslot processing module 1406 determines one or more timeslots (e.g. timeslot 1110) for transmitting a beacon based on the reference timing information. The signal processing module 1408 transmits (via the transmission module 1412) the beacon during at least one timeslot of the one or more timeslots. The beacon may be transmitted in one or more directions respectively corresponding to a number of subslots (e.g., subslots 1152) of the at least one timeslot (e.g., timeslot 1110). Moreover, the beacon may include beamforming capability information of the apparatus 1402. In an aspect, the beacon may be transmitted in a direction selected according to a pseudo-random method. The pseudo-random method may be computed based on a cell identifier of the apparatus 1402 or assigned to the apparatus 1402. In a further aspect, the beacon may be transmitted in a plurality of directions simultaneously.

The receiving module 1404 may receive a response signal from a user equipment (UE) (e.g., UE 1450) during at least one other timeslot (e.g., timeslot 1160) of the one or more timeslots. The response signal may be received in a direction corresponding to the one or more directions in which the beacon is transmitted.

Additionally or alternatively, the signal processing module 1408 may refrain to transmit the beacon in at least one subslot of the at least one timeslot. The discovery module 1410 may discover (via the receiving module 1404) a presence of at least one other CP (e.g., CP 1480) during the at least one subslot. Thereafter, the timeslot processing module 1406 determines a transmission timing of the at least one other CP 1480 and adjusts a boundary of the one or more timeslots based on the transmission timing of the at least one other CP 1480. The beacon may be transmitted in a subband different from a subband used by the at least one other CP 1480 for transmission.

Additionally or alternatively, the signal processing module 1408 may transmit (via the transmission module 1412) data or control information in at least one direction while transmitting the beacon in at least one other direction.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
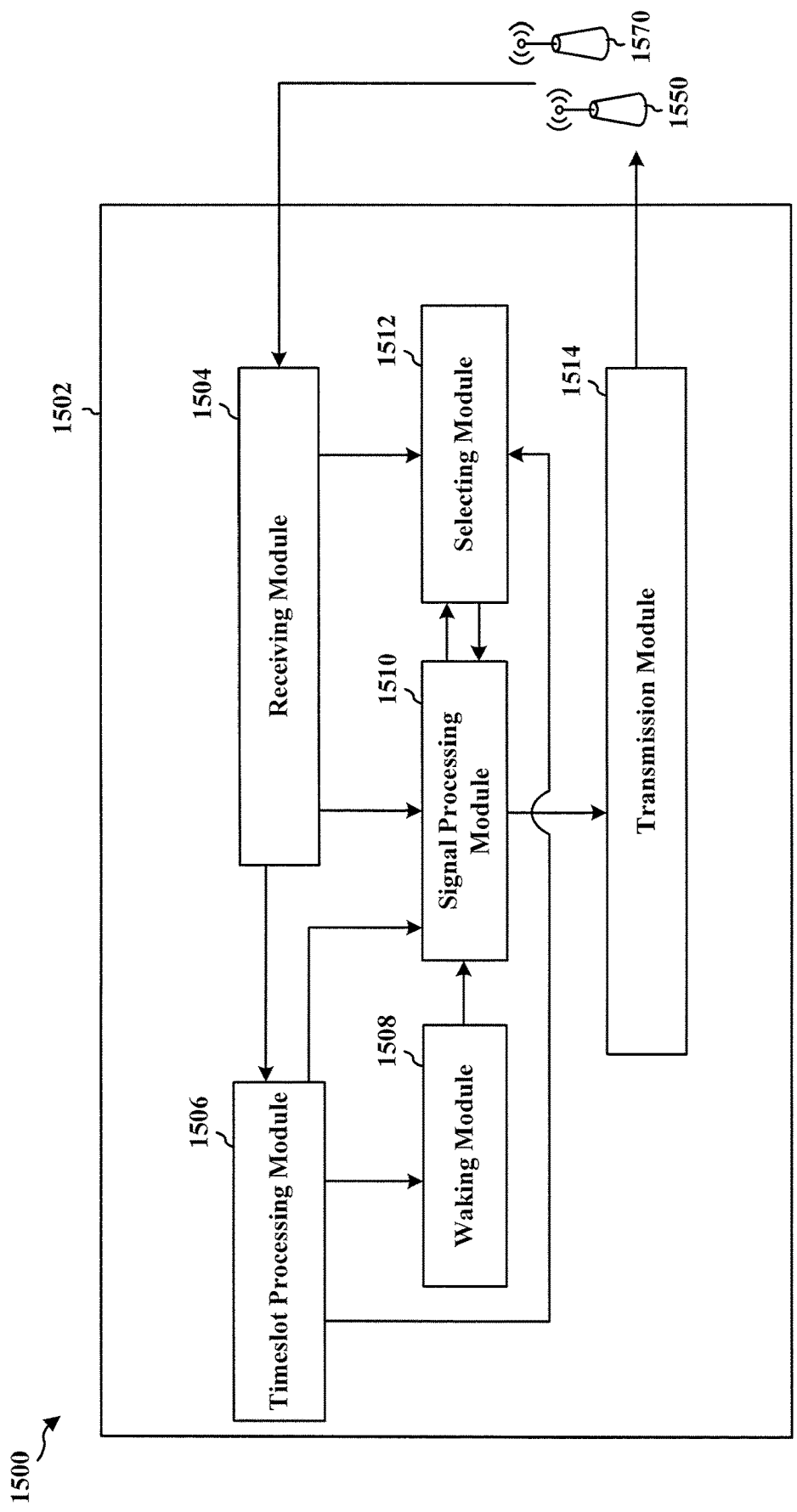
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE capable of communicating signals via lower-frequency channels (e.g., via a LTE system) and higher-frequency channels (e.g., via a mmW system). The apparatus includes a receiving module 1504, a timeslot processing module 1506, a signal processing module 1510, a selecting module 1512, and a transmission module 1514.

The receiving module 1504 receives receiving reference timing information. For example, the receiving module 1504 receives the reference timing information from an external source 1570 (e.g., LTE source).

The timeslot processing module 1506 determines one or more timeslots (e.g. timeslot 1110) for receiving at least one beacon respectively from at least one connection point (e.g., CP 1550) based on the reference timing information. A respective beacon may include beamforming capability information of a respective connection point.

The waking module 1508 wakes during at least one timeslot (e.g., timeslot 1110) of the one or more timeslots. The signal processing module 1510 monitors for the at least one beacon in one or more directions respectively corresponding to a number of subslots (e.g., subslots 1152) of the at least one timeslot (e.g., timeslot 1110).

The signal processing module 1510 receives (via the receiving module 1504) the at least one beacon in the at least one timeslot. The at least one beacon may be received in at least one direction of the one or more directions.

Additionally or alternatively, the signal processing module 1510 may transmit (via the transmission module 1514) a response signal to a connection point (e.g., CP 1550) during at least one other timeslot (e.g., subslot 1160) of the one or more timeslots. The response signal may be transmitted in a subslot (e.g., subslot 1162*c*) of the at least one other timeslot (timeslot 1160) corresponding to a subslot (e.g., subslot 1152*c*) of the at least one timeslot (timeslot 1110) in which a beacon is received with a power greater than a threshold.

Additionally or alternatively, the selecting module 1512 may select one of a plurality of connection points that transmitted a respective beacon in the same subslot (e.g., subslot 1152*b*) of the at least one timeslot (timeslot 111). The selection may be based on the beacon that is received with a signal strength greater than a threshold and/or the beamforming capability information included in the respective beacon. The signal processing module 1510 may transmit (via the transmission module 1514) a response signal to the selected connection point during at least one other timeslot (e.g., timeslot 1160) of the one or more timeslots. The response signal may be transmitted in a subslot (e.g., subslot 1162*f*) of the at least one other timeslot (timeslot 1160) corresponding to the subslot (e.g., subslot 1152*f*) of the at least one timeslot (timeslot 1110) in which the beacon from the selected connection point is received. In an aspect, the beacon from the selected connection point is received using a first receive direction. The response signal may be transmitted to the selected connection point using a first transmit direction corresponding to the first receive direction.

Additionally or alternatively, the timeslot processing module 1506 may determine a transmission timing of the at least one connection point based on the beamforming capability information. Thereafter, the timeslot processing module 1506 may adjust a boundary of the one or more timeslots based on the transmission timing of the at least one connection point.

Additionally or alternatively, the signal processing module 1510 may determine a received power of the at least one beacon. Thereafter, the transmission module 1514 adjusts a power for transmitting a signal based on the received power of the at least one beacon.

The apparatus may include additional modules that perform each of the steps of the algorithm in the aforementioned flow charts of FIG. 13. As such, each step in the aforementioned flow charts of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
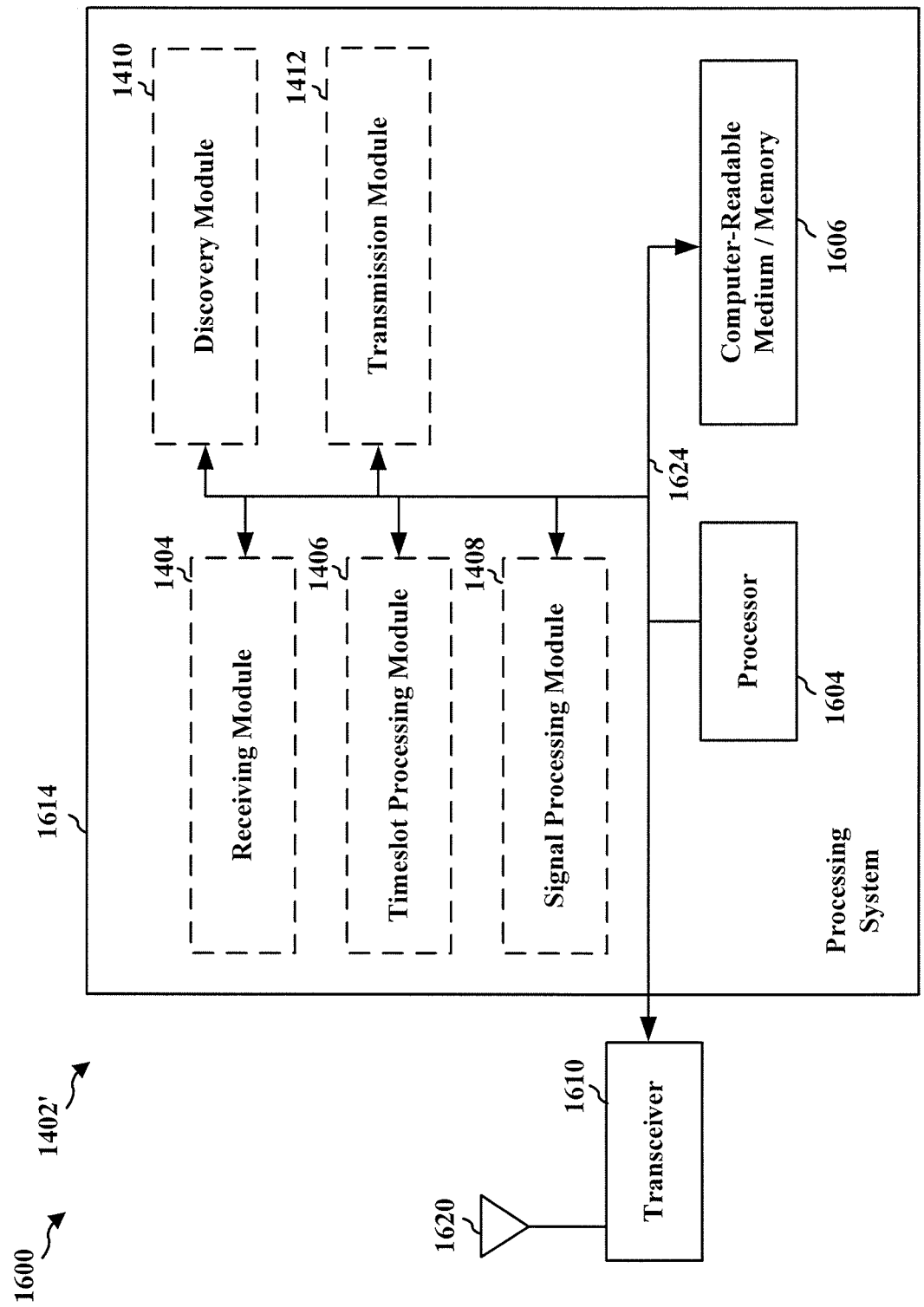
FIG. 16 is a diagram illustrating an example of a hardware implementation for an apparatus employing a processing system.

FIG. 16 is a diagram 1600 illustrating an example of a hardware implementation for an apparatus 1402' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1404, 1406, 1408, 1410, 1412, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1404. In addition, the transceiver 1610 receives information from the processing system 1614, specifically the transmission module 1412, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1404, 1406, 1408, 1410, and 1412. The modules may be software modules running in the processor 1604, resident/stored in the computer readable medium/memory 1606, one or more hardware modules coupled to the processor 1604, or some combination thereof. The processing system 1614 may be a component of the base station 610 and may include the memory 676 and/or at least one of the TX processor 616, the RX processor 670, and the controller/processor 675.

In one configuration, the apparatus 1402/1402' for wireless communication includes means for receiving reference timing information; means for determining one or more timeslots for transmitting a beacon based on the reference timing information; means for transmitting the beacon during at least one timeslot of the one or more timeslots, wherein the beacon is transmitted in one or more directions respectively corresponding to a number of subslots of the at least one timeslot, and wherein the beacon comprises beamforming capability information of the CP; means for receiving a response signal from a user equipment (UE) during at least one other timeslot of the one or more timeslots, wherein the response signal is received in a direction corresponding to the one or more directions in which the beacon is transmitted; means for transmitting data or control information in at least one direction while transmitting the beacon in at least one other direction; means for refraining to transmit the beacon in at least one subslot of the at least one timeslot; means for discovering a presence of at least one other CP during the at least one subslot; means for determining a transmission timing of the at least one other CP; and means for adjusting a boundary of the one or more timeslots based on the transmission timing of the at least one other CP.

The aforementioned means may be one or more of the aforementioned modules of the apparatus 1402 and/or the processing system 1614 of the apparatus 1402' configured to perform the functions recited by the aforementioned means. As described supra, the processing system 1614 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 17:
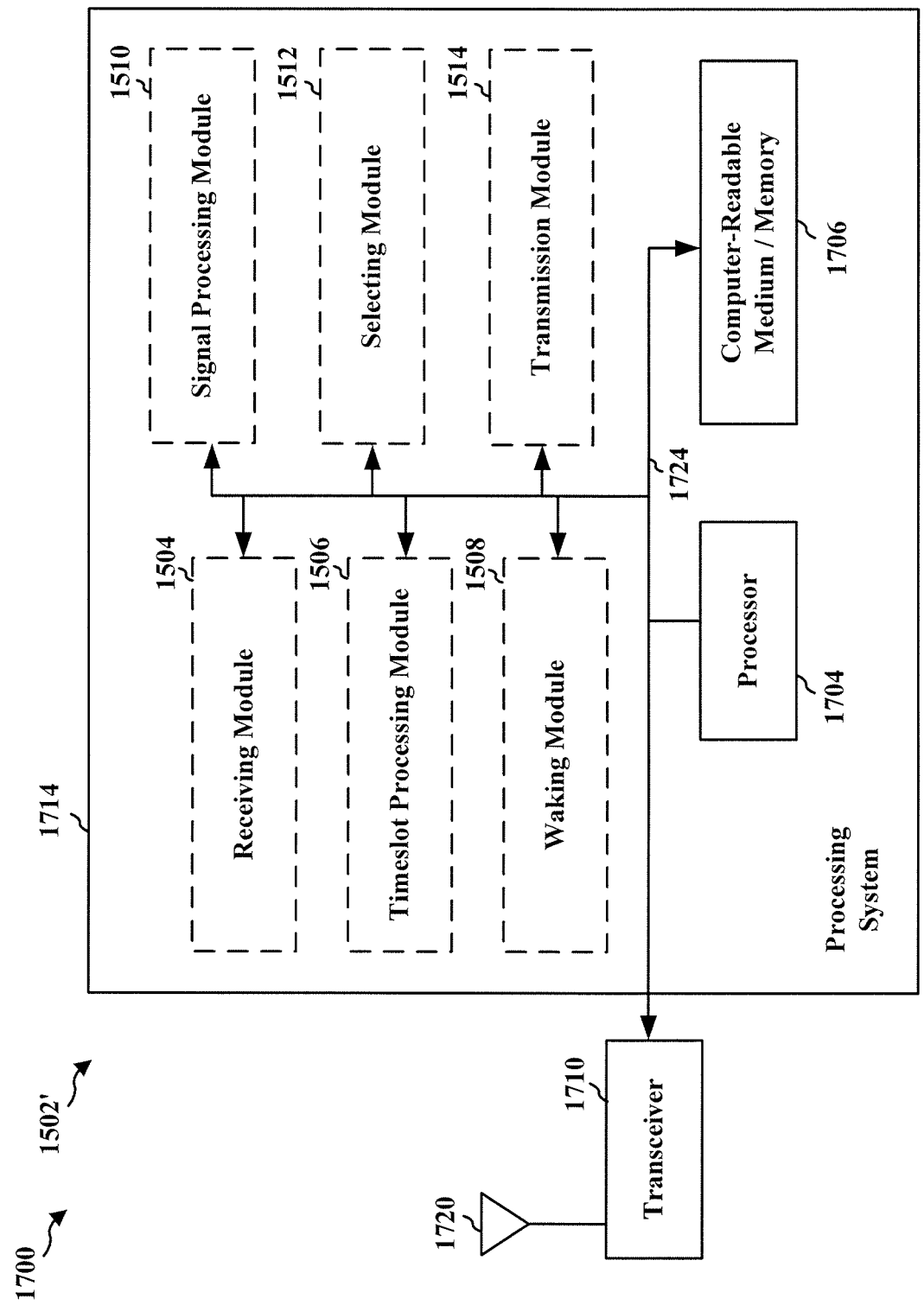
FIG. 17 is a diagram illustrating an example of a hardware implementation for an apparatus employing a processing system.

FIG. 17 is a diagram 1700 illustrating an example of a hardware implementation for an apparatus 1502' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1504, 1506, 1508, 1510, 1512, 1514 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the receiving module 1504. In addition, the transceiver 1710 receives information from the processing system 1714, specifically the transmission module 1514, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1504, 1506, 1508, 1510, 1512, and 1514. The modules may be software modules running in the processor 1704, resident/stored in the computer readable medium/memory 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1502/1502' for wireless communication includes means for receiving reference timing information; means for determining one or more timeslots for receiving at least one beacon respectively from at least one connection point based on the reference timing information, wherein a respective beacon comprises beamforming capability information of a respective connection point; means for waking during at least one timeslot of the one or more timeslots; means for monitoring for the at least one beacon in one or more directions respectively corresponding to a number of subslots of the at least one timeslot; means for receiving the at least one beacon in the at least one timeslot, wherein the at least one beacon is received in at least one direction of the one or more directions; means for transmitting a response signal to a connection point during at least one other timeslot of the one or more timeslots, wherein the response signal is transmitted in a subslot of the at least one other timeslot corresponding to a subslot of the at least one timeslot in which a beacon is received with a power greater than a threshold; means for selecting one of a plurality of connection points that transmitted a respective beacon in the same subslot of the at least one timeslot based on at least one of: the beacon that is received with a signal strength greater than a threshold, or the beamforming capability information included in the respective beacon; means for transmitting a response signal to the selected connection point during at least one other timeslot of the one or more timeslots, wherein the response signal is transmitted in a subslot of the at least one other timeslot corresponding to the subslot of the at least one timeslot in which the beacon from the selected connection point is received; means for determining a transmission timing of the at least one connection point based on the beamforming capability information; means for adjusting a boundary of the one or more timeslots based on the transmission timing of the at least one connection point; means for determining a received power of the at least one beacon; and means for adjusting a transmission power based on the received power of the at least one beacon.

The aforementioned means may be one or more of the aforementioned modules of the apparatus 1502 and/or the processing system 1714 of the apparatus 1502' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a connection point (CP), comprising:
    receiving reference timing information;
    determining one or more timeslots for transmitting a beacon based on the reference timing information;
    transmitting the beacon during at least one timeslot of the one or more timeslots,
    wherein the beacon is transmitted in one or more directions selected according to a pseudo-random method assigned by the CP, the pseudo-random method including one or more beamforming weights for transmitting the beacon in each of one or more subslots of the at least one timeslot, the one or more directions respectively corresponding to the one or more subslots of the at least one timeslot, and wherein the beacon comprises beamforming capability information of the CP, wherein the beamforming capability information of the CP indicates transmit power and connectivity to an external network;
    refraining to transmit the beacon in at least one subslot of the at least one timeslot;
    discovering a presence of at least one other CP during the at least one subslot;
    determining a transmission timing of the at least one other CP; and
    adjusting a boundary of the one or more timeslots based on the transmission timing of the at least one other CP.

2. The method of claim 1, wherein the pseudo-random method is computed based on a cell identifier of the CP.

3. The method of claim 1, further comprising:
    receiving a response signal from a user equipment (UE) during at least one other timeslot of the one or more timeslots, wherein the response signal is received in a direction corresponding to the one or more directions in which the beacon is transmitted.

4. The method of claim 1, wherein the beacon is transmitted in a plurality of directions simultaneously.

5. The method of claim 1, further comprising transmitting data or control information in at least one direction while transmitting the beacon in at least one other direction.

6. The method of claim 1, wherein the beacon is transmitted in a subband different from a subband used by the at least one other CP for transmission.

7. A method of wireless communication at a user equipment (UE), comprising:
receiving reference timing information;
determining one or more timeslots for receiving at least one beacon respectively from at least one connection point based on the reference timing information, wherein a respective beacon comprises beamforming capability information of a respective connection point, wherein the beamforming capability information of the respective connection point indicates transmit power and connectivity to an external network;
waking during at least one timeslot of the one or more timeslots;
monitoring for the at least one beacon in one or more directions respectively corresponding to one or more subslots of the at least one timeslot, wherein the at least one beacon is not in at least one of the subslots;
receiving the at least one beacon in the at least one timeslot, wherein the at least one beacon is received in at least one direction of the one or more directions, wherein the at least one direction is selected according to a pseudo-random method including one or more beamforming weights for receiving the beacon in each of the one or more subslots of the at least one timeslot;
determining a transmission timing of the at least one connection point based on the beamforming capability information; and
adjusting a boundary of the one or more timeslots based on the transmission timing of the at least one connection point.

8. The method of claim 7, further comprising:
transmitting a response signal to a connection point during at least one other timeslot of the one or more timeslots, wherein the response signal is transmitted in a subslot of the at least one other timeslot corresponding to a subslot of the at least one timeslot in which a beacon is received with a power greater than a threshold.

9. The method of claim 7, further comprising:
selecting one of a plurality of connection points that transmitted a respective beacon in the same subslot of the at least one timeslot based on at least one of:
the beacon that is received with a signal strength greater than a threshold, or
the beamforming capability information included in the respective beacon; and
transmitting a response signal to the selected connection point during at least one other timeslot of the one or more timeslots, wherein the response signal is transmitted in a subslot of the at least one other timeslot corresponding to the subslot of the at least one timeslot in which the beacon from the selected connection point is received.

10. The method of claim 9, wherein:
the beacon from the selected connection point is received using a first receive direction; and
the response signal is transmitted to the selected connection point in a first transmit direction that corresponds to the first receive direction.

11. The method of claim 7, further comprising:
determining a received power of the at least one beacon; and
adjusting a transmission power based on the received power of the at least one beacon.

12. A connection point (CP) for wireless communication, comprising:
means for receiving reference timing information;
means for determining one or more timeslots for transmitting a beacon based on the reference timing information;
means for transmitting the beacon during at least one timeslot of the one or more timeslots,
wherein the beacon is transmitted in one or more directions selected according to a pseudo-random method assigned by the CP, the pseudo-random method including one or more beamforming weights for transmitting the beacon in each of one or more subslots of the at least one timeslot, the one or more directions respectively corresponding to the one or more subslots of the at least one timeslot, and wherein the beacon comprises beamforming capability information of the CP, wherein the beamforming capability information of the CP indicates transmit power and connectivity to an external network;
means for refraining to transmit the beacon in at least one subslot of the at least one timeslot;
means for discovering a presence of at least one other CP during the at least one subslot;
means for determining a transmission timing of the at least one other CP; and
means for adjusting a boundary of the one or more timeslots based on the transmission timing of the at least one other CP.

13. The CP of claim 12, wherein the pseudo-random method is computed based on a cell identifier of the CP.

14. The CP of claim 12, further comprising:
means for receiving a response signal from a user equipment (UE) during at least one other timeslot of the one or more timeslots, wherein the response signal is received in a direction corresponding to the one or more directions in which the beacon is transmitted.

15. The CP of claim 12, wherein the beacon is transmitted in a plurality of directions simultaneously.

16. The CP of claim 12, further comprising:
means for transmitting data or control information in at least one direction while transmitting the beacon in at least one other direction.

17. The CP of claim 12, wherein the beacon is transmitted in a subband different from a subband used by the at least one other CP for transmission.

18. A user equipment (UE) for wireless communication, comprising:
means for receiving reference timing information;
means for determining one or more timeslots for receiving at least one beacon respectively from at least one connection point based on the reference timing information, wherein a respective beacon comprises beamforming capability information of a respective connection point, wherein the beamforming capability information of the respective connection point indicates transmit power and connectivity to an external network;
means for waking during at least one timeslot of the one or more timeslots;
means for monitoring for the at least one beacon in one or more directions respectively corresponding to one or more subslots of the at least one timeslot, wherein the at least one beacon is not in at least one of the subslots;
means for receiving the at least one beacon in the at least one timeslot, wherein the at least one beacon is received in at least one direction of the one or more directions, wherein the at least one direction is selected according to a pseudo-random method including one or more beamforming weights for receiving the beacon in each of the one or more subslots of the at least one timeslot;

means for determining a transmission timing of the at least one connection point based on the beamforming capability information; and means for adjusting a boundary of the one or more timeslots based on the transmission timing of the at least one connection point.

19. The UE of claim 18, further comprising:

means for transmitting a response signal to a connection point during at least one other timeslot of the one or more timeslots, wherein the response signal is transmitted in a subslot of the at least one other timeslot corresponding to a subslot of the at least one timeslot in which a beacon is received with a power greater than a threshold.

20. The UE of claim 18, further comprising:

means for selecting one of a plurality of connection points that transmitted a respective beacon in the same subslot of the at least one timeslot based on at least one of:

the beacon that is received with a signal strength greater than a threshold, or the beamforming capability information included in the respective beacon; and means for transmitting a response signal to the selected connection point during at least one other timeslot of the one or more timeslots, wherein the response signal is transmitted in a subslot of the at least one other timeslot corresponding to the subslot of the at least one timeslot in which the beacon from the selected connection point is received.

21. The UE of claim 20, wherein:

the beacon from the selected connection point is received using a first receive direction; and the response signal is transmitted to the selected connection point in a first transmit direction that corresponds to the first receive direction.

22. The UE of claim 18, further comprising:

means for determining a received power of the at least one beacon; and means for adjusting a transmission power based on the received power of the at least one beacon.

* * * * *